United States Patent
Bersch

(10) Patent No.: US 10,038,710 B2
(45) Date of Patent: Jul. 31, 2018

(54) EFFICIENT IDENTIFICATION OF LOG EVENTS IN ENTERPRISE THREAT DETECTION

(71) Applicant: SAP SE, Walldorf (DE)

(72) Inventor: Viktor Bersch, Heidelberg (DE)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/979,015

(22) Filed: Dec. 22, 2015

(65) Prior Publication Data

US 2017/0180404 A1   Jun. 22, 2017

(51) Int. Cl.
*H04L 29/06* (2006.01)
*G06F 17/30* (2006.01)

(52) U.S. Cl.
CPC .... *H04L 63/1425* (2013.01); *G06F 17/30185* (2013.01); *G06F 17/30327* (2013.01); *G06F 17/30598* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 6,532,305 B1 * | 3/2003 | Hammen | G06K 9/6282 382/159 |
| 7,380,205 B2 | 5/2008 | Bezrukov et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |
| 7,624,092 B2 | 11/2009 | Lieske et al. | |
| 7,756,808 B2 | 7/2010 | Weigt et al. | |
| 7,756,809 B2 | 7/2010 | Weigt et al. | |
| 7,761,396 B2 | 7/2010 | Weigt et al. | |
| 7,971,209 B2 | 6/2011 | Eberlein et al. | |
| 8,051,034 B2 | 11/2011 | Mehta et al. | |
| 8,234,312 B2 | 7/2012 | Thomas | |
| 8,307,012 B2 | 11/2012 | Thomas | |
| 8,661,103 B2 | 2/2014 | Mehta et al. | |
| 8,775,671 B2 | 7/2014 | Rodeck et al. | |
| 8,892,454 B2 | 11/2014 | Rabetge et al. | |
| 8,924,415 B2 | 12/2014 | Thomas | |
| 8,954,602 B2 | 2/2015 | Seifert et al. | |
| 9,037,678 B2 | 5/2015 | Mehta et al. | |
| 9,148,488 B2 | 9/2015 | Rabetge et al. | |
| 2006/0195415 A1 * | 8/2006 | Meyer | G06K 9/6282 |
| 2008/0288513 A1 | 11/2008 | Bezrukov et al. | |

(Continued)

*Primary Examiner* — Joseph P Hirl
*Assistant Examiner* — Hassan Saadoun
(74) *Attorney, Agent, or Firm* — Fish & Richardson P.C.

(57) ABSTRACT

A first set of log entries is identified. A plurality of log entry classes occurring in the first set of log entries is determined. Each log entry in a given log entry class has a same number, type, and ordering of components. A vector of component type identifiers is determined for each log entry class. Each identifier in a vector for a given log entry class identifies a position and type of a component included in a log entry belonging to the given log entry class. A classification tree is created using the vectors. An unclassified log entry not included in the first set of log entries is identified. A log entry class is assigned to the unclassified log entry using the classification tree to create a classified log entry. One or more security threat patterns are evaluated using the classified log entry.

12 Claims, 12 Drawing Sheets

(56) References Cited

U.S. PATENT DOCUMENTS

| | | |
|---|---|---|
| 2013/0304665 A1 | 11/2013 | Rodeck et al. |
| 2013/0304666 A1 | 11/2013 | Rodeck et al. |
| 2013/0326079 A1 | 12/2013 | Seifert et al. |
| 2013/0326087 A1 | 12/2013 | Storz et al. |
| 2016/0092552 A1* | 3/2016 | Morfonios ........ G06F 17/30091 707/737 |

* cited by examiner

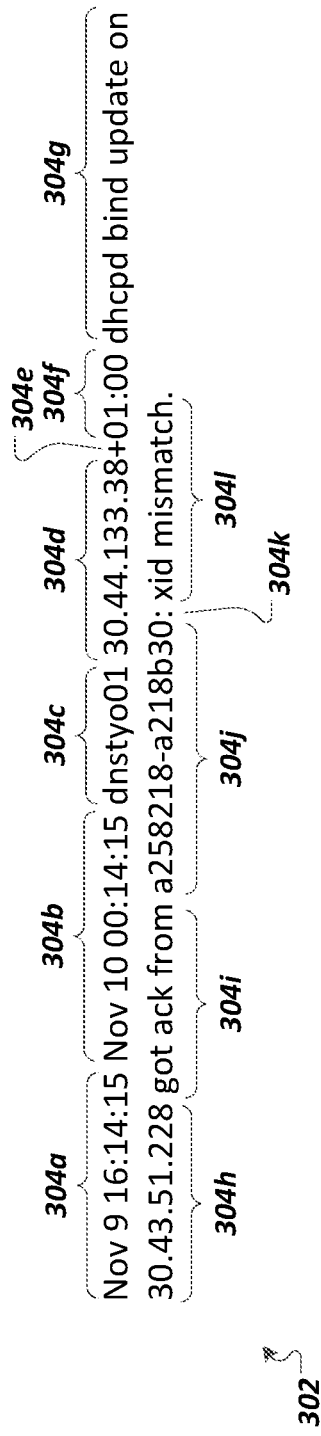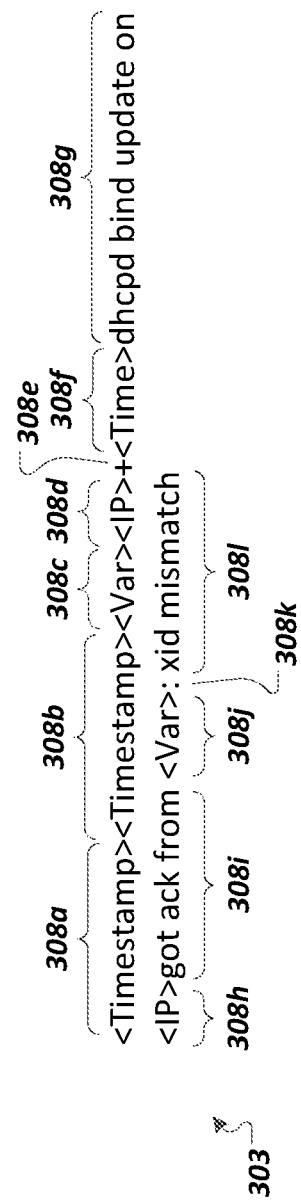

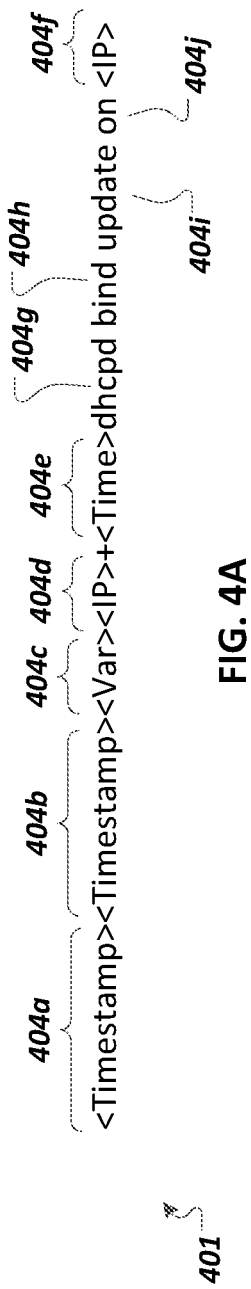
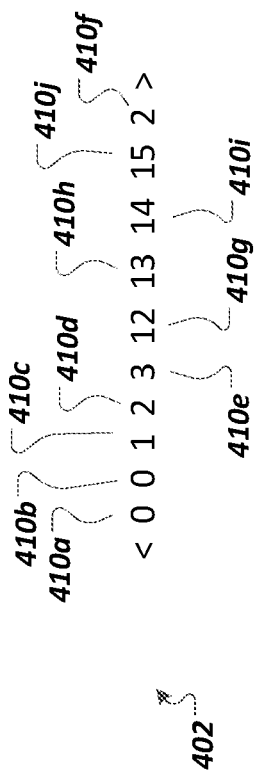
FIG. 4A
FIG. 4B

Vector | Class

| 0 | <TimeStamp> |
|---|---|
| 1 | <Time> |
| 2 | <Var> |
| 3 | <IP> |
| 4 | xid |
| 5 | mismatch |
| 6 | bind |
| 7 | update |

Log Entry to Classify:
    Nov 9 16:14:15 30.44.133.38 xid mismatch.
          534          536    544

Algorithm 1: Construction of a log classification tree.

```
 1  Tree tree = new Tree();
 2  tree.root = new Node();
    /* every line is one training data entry like 0,1,2,3,5
       with class number on last position                    */
 3  for line in data do
      /* splittedLine is an Array which contains all types of
         the training line and the class at the last position
                                                             */
 4    splittedLine = line.split(",");
 5    classNum = splittedLine[splittedLine.length - 1];
      /* Node Variable needed to navigate through the created
         tree                                                */
 6    currentNode = tree.root;
 7    for pos = 0; pos < splittedLine.length - 1; pos++ do
        /* iterate over every type for every training tuple
                                                             */
 8      type = splittedLine[pos];
 9      classNum not in currentNode.classes? add classNum to
        currentNode.classes;
10      currentNode.numInstances++;
11      if pos < splittedLine.length - 1 then
12        if !currentNode.children.contains(type) then
            /* no Branch with type as key exists, so it has
               to be created                                 */
13          Node nextNode = new Node();
14          currentNode.children.put(type, nextNode);
15        end
16        currentNode = currentNode.children.get(type);
17      end
18      else
          /* last type of the training entry leads to a leaf
             node                                            */
19        if leafNode not in currentNode.children then
20          Add leafNode to currentNode.children;
21        end
22        classNum not in leafNode.classes? add classNum to
          leafNode.classes;
23      end
24    end
25  end
```

FIG. 7

EFFICIENT IDENTIFICATION OF LOG EVENTS IN ENTERPRISE THREAT DETECTION

CROSS-REFERENCE TO RELATED APPLICATIONS

This application is a co-pending application of U.S. application Ser. No. 14/978,984, filed on Dec. 22, 2015 entitled "SYSTEM AND USER CONTEXT IN ENTERPRISE THREAT DETECTION"; and U.S. application Ser. No. 14/978,963, filed on Dec. 22, 2015 entitled "KNOWLEDGE BASE IN ENTERPRISE THREAT DETECTION"; and U.S. application Ser. No. 14/978,995, filed on Dec. 22, 2015 entitled "LOG NORMALIZATION IN ENTERPRISE THREAT DETECTION"; the entire contents of each and as a whole are incorporated herein by reference.

BACKGROUND

A computing system may maintain a data log which documents events and other activities occurring within the computing system. The data log can be stored, for example, in a file, database, or some other repository. Each entry in the data log can include a description of an event being logged, and a timestamp indicating the occurrence of the event. The entries in the data log can correspond to transactions occurring within the computing system, error conditions, or other types of events. Identification of events in data logs is often inefficiently performed.

SUMMARY

The present disclosure relates to efficient identification of log events in enterprise threat detection.

A first set of log entries is identified. A plurality of log entry classes occurring in the first set of log entries is determined. Each log entry in a given log entry class has a same number, type, and ordering of components. A vector of component type identifiers is determined for each log entry class. Each identifier in a vector for a given log entry class identifies a position and type of a component included in a log entry belonging to the given log entry class. A classification tree is created using the vectors. An unclassified log entry not included in the first set of log entries is identified. A log entry class is assigned to the unclassified log entry using the classification tree to create a classified log entry. One or more security threat patterns are evaluated using the classified log entry.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, one computer-implemented method includes: identifying a first set of log entries; determining a plurality of log entry classes occurring in the first set of log entries, each log entry in a given log entry class having a same number, type, and ordering of components; determining, for each log entry class, a vector of component type identifiers for a given log entry class, each identifier in the vector identifying a position and type of a component included in a log entry belonging to the given log entry class; creating a classification tree using the vectors; identifying an unclassified log entry not included in the first set of log entries; assigning a log entry class to the unclassified log entry using the classification tree to create a classified log entry; and evaluating one or more security threat patterns using the classified log entry.

The foregoing and other implementations can each optionally include one or more of the following features, alone or in combination:

A first aspect, combinable with the general implementation, wherein assigning a log entry class to the unclassified log entry using the classification tree comprises evaluating tokens of the unclassified log entry in accordance with the classification tree.

A second aspect, combinable with the general implementation, wherein the classification tree comprises a plurality of candidate log entry classes, evaluating tokens of the unclassified log entry comprises eliminating candidate log entry classes from consideration until one remaining candidate log entry class remains, and assigning the log entry class comprises assigning the one remaining candidate log entry class to the unclassified log entry.

A third aspect, combinable with the general implementation, wherein each log entry class is associated with a unique log entry class identifier.

A fourth aspect, combinable with the general implementation, wherein each log entry class identifier is included in a leaf node of the classification tree.

A fifth aspect, combinable with the general implementation, wherein each vector is represented in the classification tree as a path beginning at a root node and ending at a respective leaf node corresponding to the log entry class associated with the vector.

A sixth aspect, combinable with the general implementation, wherein each respective non-leaf node of the classification tree corresponds to a particular token position of the unclassified log entry and to one or more candidate log entry classes that are each represented by a sub-path of the classification tree beginning at the root node and ending at the respective non-leaf node.

A seventh aspect, combinable with the general implementation, wherein each branch of the classification tree is associated with a component type identifier of one or more vectors.

An eighth aspect, combinable with the general implementation, wherein each branch is associated with a test which evaluates a current token of the unclassified log message to determine whether the current token matches a component type associated with the branch.

A ninth aspect, combinable with the general implementation, comprising following a respective branch to a next node of the classification tree when an outcome of the test associated with the branch indicates a match between the current token and the component type associated with the branch.

A tenth aspect, combinable with the general implementation, wherein assigning the log entry class comprises determining that the next node is associated with the one remaining candidate log entry class and no other candidate log entry classes; and assigning the one remaining candidate log entry class to the unclassified log entry.

The subject matter described in this specification can be implemented in particular implementations so as to realize one or more of the following advantages. An unclassified log entry can be efficiently classified using a classification tree. The classification tree can be used to rule out candidate classes for the unclassified log entry until one candidate class remains. The remaining candidate class can be assigned to the unclassified log entry. Classified log entries can be used to detect security threats. Classified log entries can be used for log management. Classified log entries can be used for resolving problems occurring in distributed systems. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A and 3B illustrate an example log entry and a corresponding log entry structure, respectively, according to an implementation.

FIGS. 4A-4C illustrate an example log entry structure, an example log entry class vector, and example log entry component identifier mappings, respectively, according to an implementation.

FIG. 5A illustrates example log entry class vectors that respectively correspond to first and second log entry classes, according to an implementation.

FIG. 5B illustrates example log entry component identifier mappings, according to an implementation.

FIG. 7 illustrates an example algorithm for building a classification tree, according to an implementation.

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Figure 1:
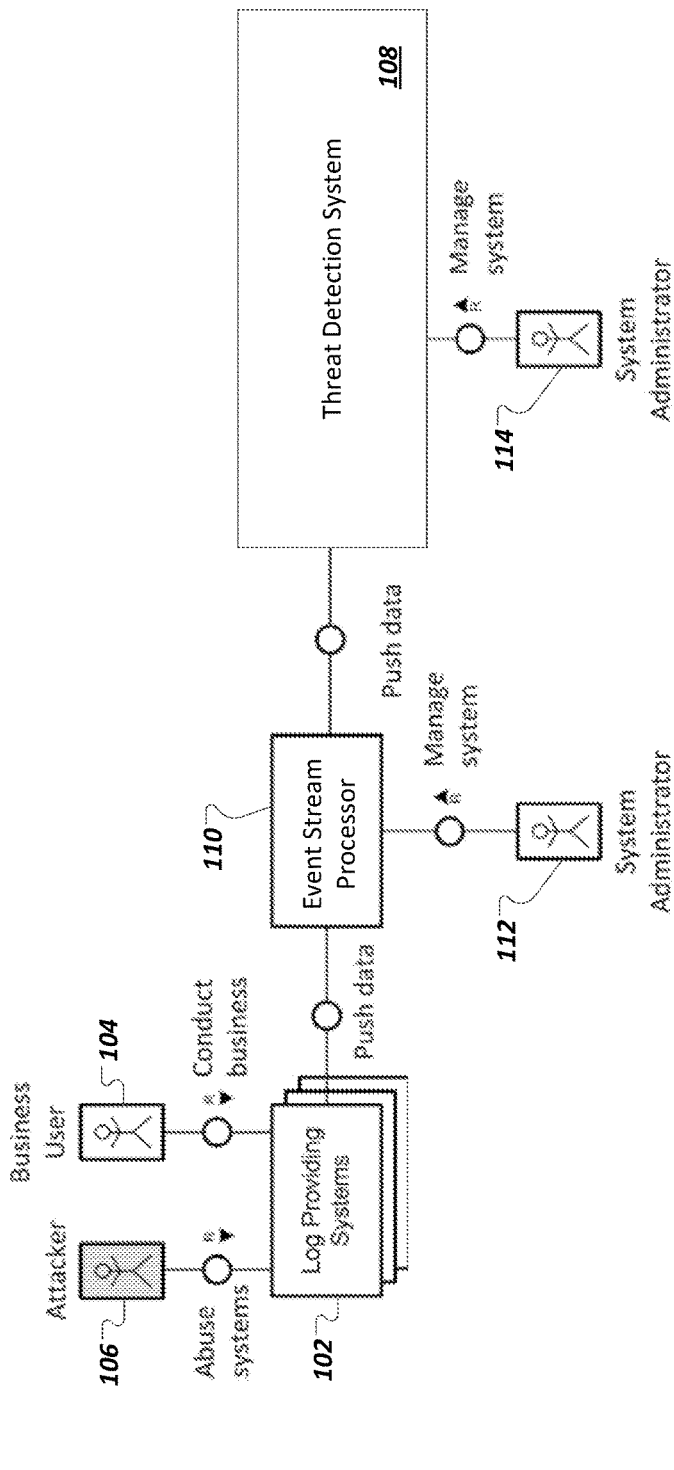
FIG. 1 is a high-level architectural block diagram illustrating an example distributed computing system (EDCS) for efficient identification of log events in enterprise threat detection, according to an implementation.

FIG. 1 is a high-level architectural block diagram illustrating an example distributed computing system (EDCS) 100 for the efficient identification of log events in enterprise threat detection, according to an implementation. Log-providing systems 102 can generate various types of log data, such as from automated processes and through the use of such systems by business users 104 and other users. The log-providing systems 102 can include heterogeneous landscapes, business systems, interconnected systems, mobile and cloud-based systems, applications, network components (e.g., proxies, routers, switches), or any other system that generates log data. Log data can include, for example, data from user change logs, business transaction logs, change document logs, gateway logs, HTTP (Hypertext Transfer Protocol) server logs, read access logs, system logs, security audit logs, etc.

Log data generated by log-providing systems 102 can provide a wealth of information regarding activities that occur within an application, a database, an operating system, or a network component, for example. Log data can also include evidence of malicious activity performed, for example, by an attacker user 106 or an attacking computing system (e.g., a log providing system 102 used by the attacker user 106). A threat detection system 108 can evaluate log data generated by the log-providing systems 102 to identify potential security threats.

The log-providing systems 102 can provide log data to an event stream processor 110. The event stream processor 110 can, for example, provide one or more services to the log-providing systems 102 for providing log data to the event stream processor 110. As illustrated, log data is pushed from the log providing system 102 to the event stream processor 110 using a "push" service provided by the event stream processor 110. In other implementations, log data can be pulled or pushed/pulled to/from the log providing system 102 using a pull or push/pull service provided by the event stream processor 110. In still other implementation, the event stream processor 110 can register with each individual log providing system 102 which provides a push and/or pull service to allow the event stream processor 110 to access log data. In other possible implementations, the push and/or pull services can be provided by one or both of the log providing system 102 and the event stream processor 110. As will be understood by those of ordinary skill in the art, other methods of transferring log data between the components of the EDCS 100 are possible. These other methods, where consistent with this disclosure, are considered to be within the scope of this disclosure.

Typically, the event stream processor 110 can normalize, filter, transform, and/or enrich log data, from multiple log-providing systems 102, As described in more detail below, the event stream processor 110 can classify received log data, such as log data received from a log-providing system 102 that does not initially have an identified structure. For example, the event stream processor 110 can generate a classification tree using training data provided by a system administrator 112 and use the classification tree to classify received log entries.

The event stream processor 110 can provide data, including classified log data, to the threat detection system 108. Note that data provided to the threat detection system 108 can, similar to data transfer between a log providing system 102 and the event stream processor 110, be configured to be accessible using a push and/or pull service provided by the event stream process or 110 and/or the threat detection system 108 or another method consistent with this disclosure. The threat detection system 108 can, for example, evaluate the classified log data to determine whether the classified log data matches one or more threat detection patterns that are defined, e.g., by a system administrator 114, using one or more rules. A runtime component of the threat detection system 108 can determine whether a received, classified log entry matches one or more rules. When a received, classified log entry matches a rule, an alert can be generated, for example.

Figure 2:
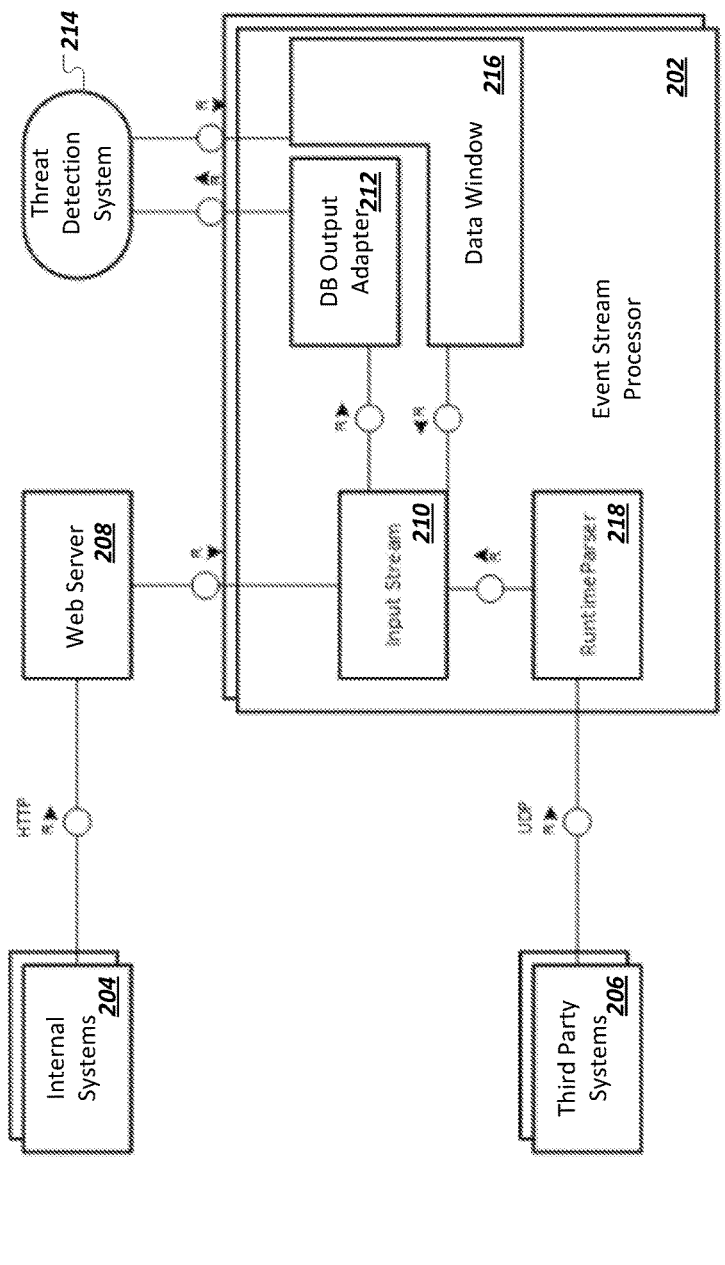
FIG. 2 is a lower-level architectural block diagram illustrating additional components of the EDCS of FIG. 1 for efficient identification of log events in enterprise threat detection, according to an implementation.

FIG. 2 is a lower-level architectural block diagram 200 illustrating additional components of the EDCS of FIG. 1 for efficient identification of log events in enterprise threat detection, according to an implementation. An event stream processor 202 (e.g., event stream processor 110) can receive log data, for example, from one or more internal systems 204 and/or from one or more third party systems 206 (e.g., each of internal system 204 and third party system 206 as a log generating system 102). In the illustrated block diagram 200, the internal systems 204 can, for example, communicate using HTTP with a web server 208 which connects the internal systems 204 with the event stream processor 202. The web server 208 can forward log data to the event stream processor 202. Third party systems 206 can forward log data to the event stream processor 202 using, for example, User Datagram Protocol (UDP) or other protocol consistent with this disclosure.

An input stream component 210 can augment data received from the internal systems 204 or third party systems 206 with user or system context information. For example, the input stream component 210 can add a system identifier and other system context information to received log data. As another example, the input stream component 210 can identify a system-specific user identifier in received log data and add a global user context identifier to the received log data. The global user context identifier can be used to identify log data associated with a particular user that is associated with multiple systems. User information can be anonymized, such as with a user pseudonym. A database (DB) output adapter 212 can provide the augmented data to a threat detection system 214 (e.g., threat detection system 108). A data window 216 can be used by the event stream processor 202 to store data received from the threat detection system 214, such as configuration data used for the classification of received log data.

In some implementations and as illustrated in FIG. 2, the structure of data received from the internal systems 204 can be known by the event stream processor 202 so that particular identification of log events is not necessary. However, the structure of data received from the third party systems 206 may be initially unknown by the event stream processor 202. The runtime parser 218 can be configured to identify/classify received log entries that have an unknown structure for the purposes of enterprise threat detection.

In typical implementations, the runtime parser 218 can operate in two modes: 1) a training mode in which the runtime parser 218 learns log entry patterns based on training data and builds a classification tree to be used for classifying log entries and 2) a production mode in which the runtime parser 218 classifies incoming log entries using the classification tree.

In the training mode, the runtime parser 218 can identify a set of training log entries. For example, an administrator user (e.g., system administrator 112 of FIG. 1) can upload the training log entries. The runtime parser 218 can evaluate the training log entries to determine a plurality of log entry classes occurring in the training log entries. Each log entry in a given log entry class has a same number, type, and ordering of components, for example. Components can include items occurring in a log message, such as a timestamp, user identifier, system identifier, IP (Internet Protocol) address, URL (Uniform Resource Locator), variable text, literal text, or other items.

Using the training log entries, the runtime parser 218 can determine a vector of component type identifiers for each determined log entry class. A vector for a log entry class can represent the component types included in log entries belonging to the log entry class. Each identifier in a vector can identify a position and type of a component included in a log entry belonging to the log entry class associated with the vector. As described in more detail below, the runtime parser 218 can create a classification tree using the vectors to identify log events in the received training log entries.

In the production mode, the runtime parser 218 can be used to identify an unclassified log entry not included in the training log entries. For example, the runtime parser 218 can receive an unclassified log message from a third party system 206. As described in more detail below, the runtime parser 218 can assign a log entry class to the unclassified log entry using the created classification tree to create a classified log entry. The classified log entry 214 can then be provided to the threat detection system 214 to be used to evaluate one or more security threat patterns.

The method used by the runtime parser 218 to use the classification tree to classify an unclassified log message can be referred to as fast-forward decision-making method. The fast-forward decision making method can result in a faster classification of the unclassified log entry as compared to other methods, such as pattern-matching the full raw unclassified log entry against known patterns. The fast-forward decision making method can include evaluating tokens of the unclassified log message according to matching tests associated with the classification tree. The matching tests can be used to eliminate candidate log entries classes from consideration until, for example, one candidate log entry class remains. The runtime parser 218 can then assign the one remaining candidate log entry class to the unclassified log entry. In other implementations, one or more remaining candidate log entry classes can remain that can be disambiguated using known or proprietary disambiguation-type algorithms to select the appropriate log entry class.

FIGS. 3A and 3B illustrate an example log entry 302 and a corresponding log entry structure 303, respectively, according to an implementation. As will be understood by those of ordinary skill in the art, this example is only one of a myriad of possible log entries and log entry structures. The example log entry 302 is provided for clarity and understanding and is not meant to limit the disclosure in any way. The log entry 302 includes multiple components, with each component being either literal text, variable text, or an instance of a particular data type. For example, the log entry 302 includes a first timestamp 304a, a second timestamp 304b, first variable text 304c, a first IP address 304d, a literal "+" symbol 304e, a time value 304f, literal text 304g of "dhcpd bind update on", a second IP address 304h, literal text 304i of "got ack from", second variable text 304j, a literal ":" symbol 304k, and literal text 304l of "xid mismatch".

The log entry structure 303 represents the structure of the log entry 302 and can be used to define a class that represents all log entries that conform to a same structure. The log entry structure 303 includes sets of markup symbols (e.g., tags, "<>") which indicate data types and positions of components included in the log entry 302. The log entry structure 303 includes a tag for each typed or variable data instance included in the log entry 302. Literal text, literal symbols, and white space included in the log entry 302 is left unchanged in the log entry structure 303.

For example, a first timestamp tag 308a, a second timestamp tag 308b, a first variable tag 308c, a first IP tag 308d, a time tag 308f, a second IP tag 308h, and a second variable tag 308j correspond to the first timestamp 304a, the second timestamp 304b, the first variable text 304c, the first IP address 304d, the time value 304f, the second IP address 304h, and the second variable text 304j, respectively. Literal items 308e, 308g, 308k, and 308l respectively correspond to the literal symbol 304e, the literal text 308g, the literal symbol 304k, and the literal text 304l.

Figure 4C:
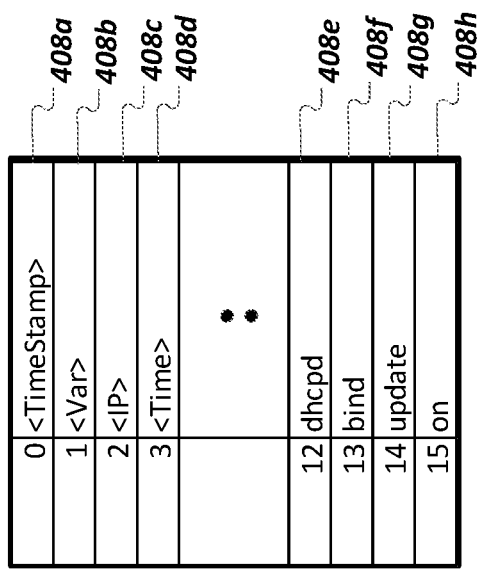

FIGS. 4A-4C illustrate an example log entry structure 401 (e.g., a portion of log entry structure 303), an example log entry class vector 402, and example log entry component identifier mappings 403, respectively, according to an implementation. The log entry structure 401 illustrates a structure of a particular class of log entries. For example, each log entry in the class has a same structure that includes a first timestamp, a second timestamp, variable text, a first IP address, a time value, and a second IP address respectively corresponding to tags 404a, 404b, 404c, 404d, 404e, and 404f included the log entry structure 401. Each log entry in the class also includes literal text values "dhcpd" 404g, "bind" 404h, "update" 404i, and "on" 404j.

The log entry component identifier mappings 403 includes mappings of unique identifiers to unique types of components included in the log entry structure 401. For example, a unique identifier is assigned to each data type included in the log entry structure 401 (e.g., <TimeStamp>, <Var>, <IP>, and <Time> are assigned identifiers of 0, 1, 2, and 3, as illustrated by mapping entries 408a, 408b, 408c, and 408d, respectively). Each literal text token included in the log entry structure 401 is also assigned a unique identifier (e.g., mapping entries 408e, 408f, 408g, and 408h illustrate the mapping of identifiers 12, 13, 14, and 15 to the literal text values "dhcpd" 404g, "bind" 404h, "update" 404i, and "on" 404j, respectively). In some implementations, literal symbols (e.g., "+") and whitespace included in the log entry structure 401 are not assigned identifiers in the log entry component identifier mappings 403.

The log entry class vector 402 is an identifier-based representation of the log entry structure 401, using identifiers from the log entry component identifier mappings 403. As described in more detail below, the log entry class vector 402, and other log entry class vectors for other classes of log entries that may be discovered in a particular log, are used for creating a classification tree for the particular log. The log entry class vector 402 includes a series of identifiers, with each identifier corresponding to a type and position of a component of the log entry structure 401.

For example, the vector element 410a of "0" in the first position of the log entry class vector 402 corresponds to the <Timestamp> tag 404a and the mapping entry 408a. Similarly, vector elements 410b, 410c, 410d, 410e, and 410f respectively correspond to the tags 404b, 404c, 404d, 404e, and 404f, and to the mapping entries 408a, 408b, 408c, 408d, and 408c. Vector elements 410g, 410h, 410i, and 410j respectively correspond to the literal text values "dhcpd" 404g, "bind" 404h, "update" 404i, and "on" 404j, and to the mapping entries 408e, 408f, 408g, and 408h, respectively.

Figures 5C, 5D:
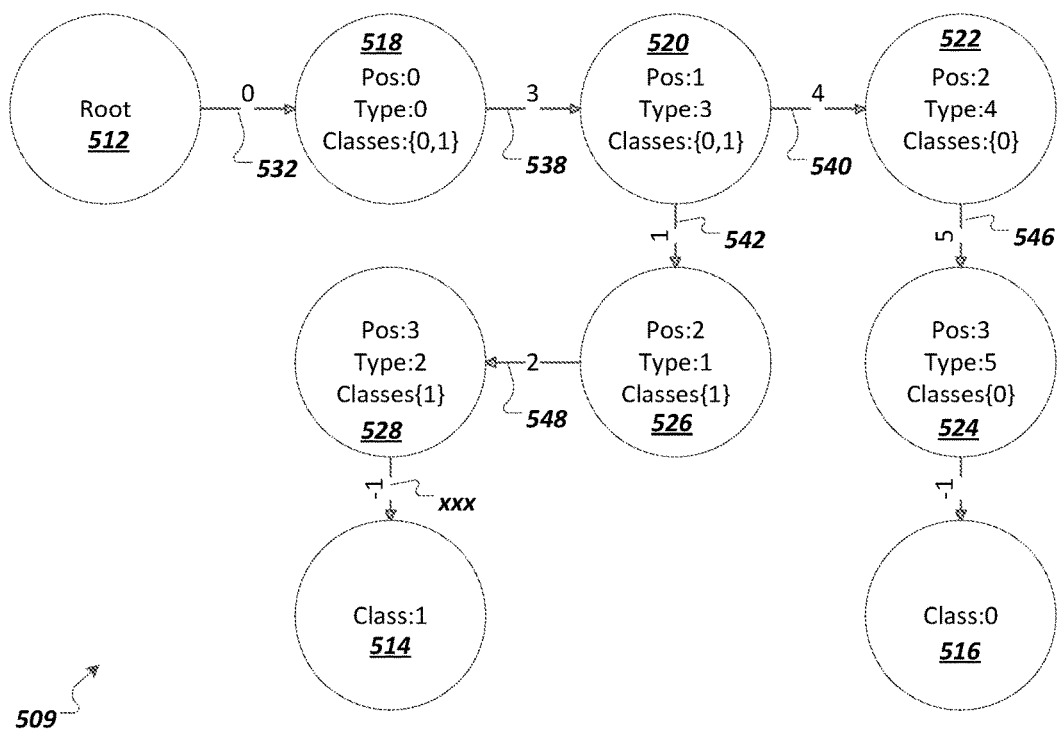
FIG. 5C illustrates an example classification tree, according to an implementation.
FIG. 5D illustrates an example unclassified log entry, according to an implementation.

FIG. 5A illustrates example log entry class vectors 502 and 504 that respectively correspond to first and second log entry classes, according to an implementation. The example log entry class vectors 502 and 504 can be used to generate a classification tree (e.g., the classification tree 509 described below with respect to FIG. 5C). The first and second log entry classes represent classes of log entries discovered in training log data. The log entry class vector 502, which has an identifier of "0" for the first log entry class as a last element 506, includes elements "0", "3", "4", and "5" which each identify a type and position of a component included in log entries that belong to the first log entry class. Similarly, the log entry class vector 504, which has an identifier of "1" for the second log entry class as a last element 508, includes elements "0", "3", "1", and "2" which each identify a type and position of a component included in log entries that belong to the second log entry class. The vector elements included in the example log entry class vectors 502 and 504 can correspond to predefined component-identifier mappings.

FIG. 5B illustrates example log entry component identifier mappings 510, according to an implementation. Based on the log entry component identifier mappings 510, the elements "0", "3", "4", and "5" of the log entry class vector 502 respectively represent timestamp, IP address, "xid" literal text, and "mismatch" literal text components that are included in log entries that are associated with the first log entry class. Similarly, the elements "0", "3", "1", and "2" of the log entry class vector 504 respectively represent timestamp, IP address, time, and variable text components that are included in the second log entry class.

FIG. 5C illustrates an example classification tree 509, according to an implementation. The classification tree 509 includes a root node 512 and leaf nodes 514 and 516. The leaf node 514 corresponds to the second log entry class and is associated with a class identifier of "1" corresponding to the last element 508 of the log entry class vector 508. Similarly, the leaf node 516 corresponds to the first log entry class and is associated with a class identifier of "0" corresponding to the last element 506 of the log entry class vector 506. The first log entry class is represented in the classification tree 509 by a path from the root node 512 to the leaf node 516, including intervening nodes 518, 520, 522, and 524. The second log entry class is represented in the classification tree 509 by a path from the root node 512 to the leaf node 514, including intervening nodes 518, 520, 526, and 528. An algorithm that can be used to generate the classification tree 509 is discussed in more detail below with respect to FIG. 8.

FIG. 5D illustrates an example unclassified log entry 530, according to an implementation. The classification tree 509 can be used to classify the unclassified log entry 530. The unclassified log entry 530 can be, for example, a raw log entry 530. A raw log entry is a text string, for example, such as a line in an unstructured log. A runtime parser (e.g., the runtime parser 218 described above with respect to FIG. 2) can evaluate the raw log entry 530 in accordance with the classification tree 509.

Each node of the classification tree 509, including the root node 512 and nodes 518-528, can be associated with one or more test functions, which are each configured to test a current token of an unclassified log entry regarding whether the token matches an expected component type. The expected types of tokens are identified based on the structure of the classification tree 509.

For example, each branch of the classification tree 509 identifies known component types that have occurred in training data at a particular token position of a training log entry. For example, a branch 532 originating at the root node 512 indicates that training data log entries have started with a component of a type associated with an identifier of "0" (e.g., a timestamp, as indicated by the log entry component identifier mappings 510). The branch 532 is associated with a test which indicates whether a first token of an unclassified log entry (e.g., a first token 534 of the raw log entry 530) is of a timestamp component type. In some implementations, a test to determine whether a token is a timestamp uses a nested classification tree, as described in more detail below with respect to FIG. 7.

While classifying the raw log entry 530, the runtime parser can execute the test function associated with the timestamp component type, determine that the first token 534 is a timestamp, and follow the branch 532 so that the node 518 is a current node under test. The node 518 indicates that a current token position of the raw log entry 530 is "0" (e.g., a first token position, with token positions starting at zero), that the type of the first token has been identified as a component of a type "0" (e.g., timestamp), and that candidate classes of the raw log entry 530 at this point of classification are classes "0" and "1" (e.g., the first and second log entry classes).

The runtime parser can identify a next token (e.g., a second token 536) of the raw log entry 530 and can determine that only one branch (e.g., a branch 538) originates from the node 518. The runtime parser can identify a component type as (e.g., IP address) associated with a component type of "3" corresponding to the branch 538. The runtime parser can execute a test associated with the IP address component type to determine that the second token 536 matches an IP address. Based on the successful outcome of the IP address test associated with the branch 538, the runtime parser can follow the branch 538 so that the node 520 is the current node under test.

The node 520 indicates that a current token position of the raw log entry 530 is "1" (e.g., a second token position), that the type of the second token has been identified as a component of a type "3" (e.g., an IP address), and that candidate classes of the raw log entry 530 at this point of classification are still the classes "0" and "1". A branch 540 and a branch 542 both originate from the node 520. The branches 540 and 542 respectively indicate that log entries have included both a component of type "4" (e.g., "xid" literal text) and a component of type "1" (e.g., a time value) as a third component of respective training log entries.

The runtime parser can identify a third token 544 of the raw log entry 530 and a test function token associated with the branch 542 which determines whether the third token 544 is a time value. The runtime parser can perform the test associated with the branch 542 to determine that the third token 544 is not a time value. Test functions can be written to determine, as efficiently as possible, whether a given token does not match a particular component type. For example, the test function associated with the branch 542 can be written to determine whether a given token starts with a non-numeric value. A time value can be assumed to start with a numeric value, so detecting a non-numeric value in a first character of a token can be a way to determine that the token is not a time value.

Based on determining that the third token 544 is not a time value, the runtime parser can identify and perform a test function associated with the branch 540 which determines whether the third token 544 matches the literal text "xid". The runtime parser can determine that the third token 544 does match the literal text "xid" and based on that determination, can follow the branch 540 so that the node 522 is the current node under test.

The runtime parser can determine that the node 522 is associated with only one remaining candidate class (e.g., a class "0") to be assigned as the class of the raw log entry 530. Because there is only one remaining candidate class, the runtime parser can determine that further navigation of the classification tree 509 is unnecessary (e.g., that tests associated with branches 546 and 548 do not need to be performed). The runtime parser can use the classification tree to exclude other all other candidate classes other than the remaining candidate class, and can therefore assign the remaining candidate class to the raw log entry 530.

If, when performing each test in a set of tests associated with branches originating from a node, the runtime parser determines that all tests in the set have failed, the runtime parser can determine that the class of the raw log entry 530 is unknown. If unknown log entry types are encountered, additional training phases can be performed. Incremental training data can be used to update the classification tree 509 to represent additional training instances, for example.

Figure 6A:
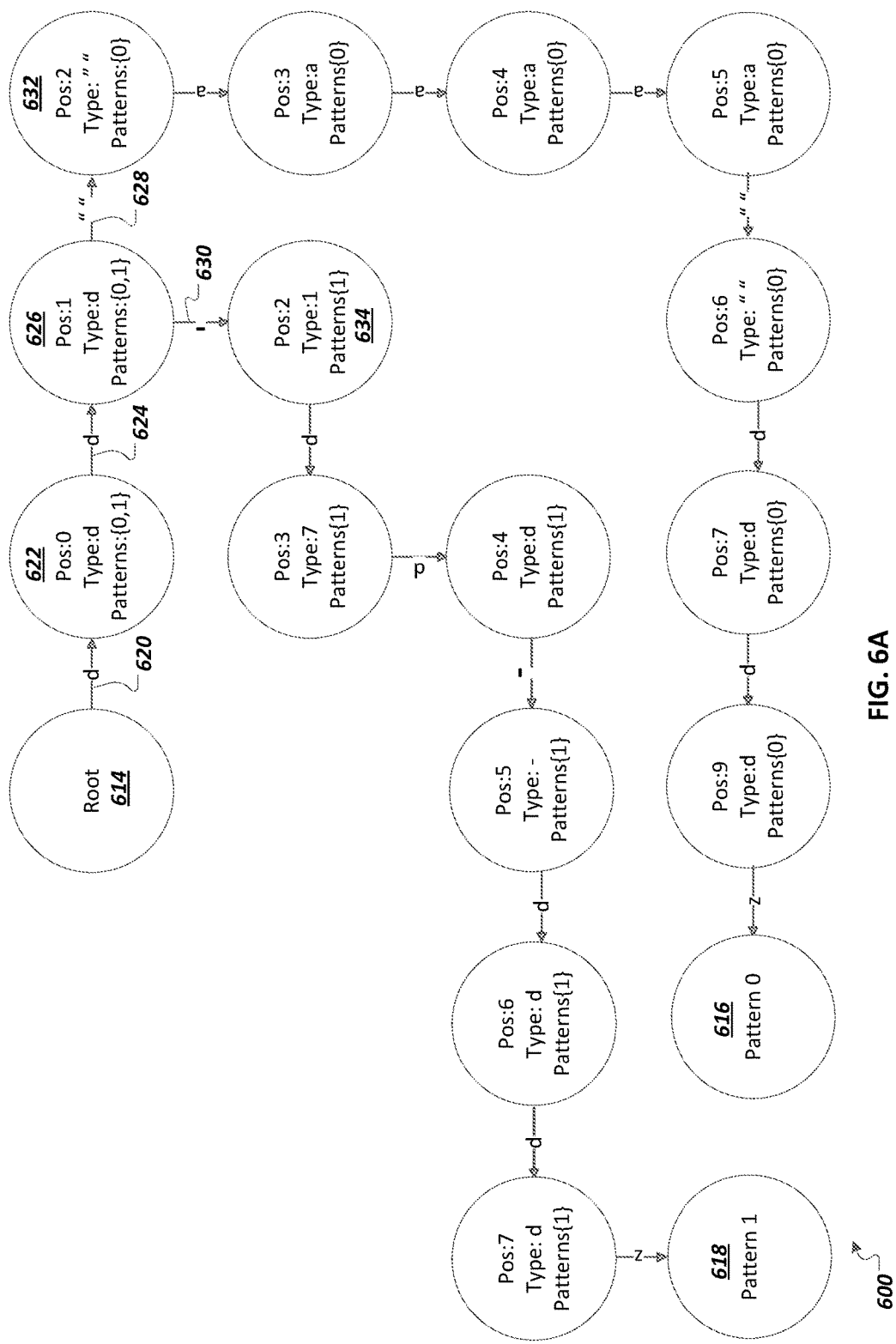
FIG. 6A illustrates an example classification tree that can be used to determine whether a token of a raw log entry is a timestamp, according to an implementation.

FIG. 6A illustrates an example classification tree 600 that can be used to determine whether a token of a raw log entry is a timestamp, according to an implementation. In some implementations, other classification trees can be used to determine whether a token matches other types of components. Timestamp values can be in any of a variety of formats, or patterns. A timestamp value can include various combinations of both date and time patterns, for example. The classification tree 600 can be used to represent combinations of date and time patterns. However, for brevity of description and to assist understanding, the illustrated classification tree 600 represents two example date-only patterns that may be included in a timestamp.

Figure 6B:
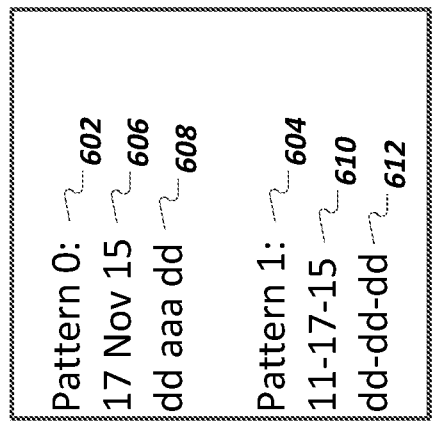
FIG. 6B illustrates example date patterns, according to an implementation.

FIG. 6B illustrates example date patterns 602 and 604, according to an implementation. The date pattern 602 (exemplified by a date sample 606 of "17 Nov 15") can be represented as a coded pattern 608 of "dd aaa dd", where a "d" represents a digit and an "a" represents a letter (e.g., the coded pattern 608 includes two digits representing a day value, three characters representing a month value, and two digits representing the last two digits of a year value). Similarly, the date pattern 604 (exemplified by a date sample 610 of "11-17-15") can be represented as a coded pattern 612 of "dd-dd-dd" (e.g., the coded pattern 612 includes two digits representing a month value, a first dash, two digits representing a day value, a second dash, and two digits representing the last two digits of a year value).

The coded patterns 608 and 612 are represented in the classification tree 600. For example, the coded pattern 608 (and by association, the date pattern 602) is represented by a path starting at a root node 614 and ending at a leaf node 616. The coded pattern 612 (and by association, the date pattern 604) is represented by a path starting at the root node 614 and ending at a leaf node 618.

The runtime parser can use the classification tree 600 to determine whether a token matches a date pattern represented in the classification tree 600. For example, the runtime parser can perform an "is digit" test on the first character of the token (e.g., as represented by a branch 620). If the first character of the token is not a digit, the runtime parser can determine that the token is not a date value. If the first character of the token is a digit, the runtime parser can follow the branch 620 to proceed to a node 622. The node 622 indicates that both the date pattern 602 and the date pattern 604 are still candidate patterns, so the runtime parser can perform another "is digit" test on the second character of the token (e.g., as represented by a branch 624). If the second character of the token is not a digit, the runtime parser can determine that the token is not a date value. If the second character of the token is a digit, the runtime parser can follow the branch 624 to proceed to a node 626.

The node 626 indicates that both the date pattern 602 and the date pattern 604 are still candidate patterns. Both a branch 628 and a branch 630 originate from the node 626. The runtime parser can perform a test corresponding to the branch 628 to determine whether the third character of the token is a space character. If the third character is a space character, the runtime parser can follow the branch 628 to a node 632. The node 632 indicates that only the date pattern 602 is a remaining candidate pattern. Accordingly, the runtime parser 632 can classify the token as a date value. In some implementations, the pattern 602 is also associated with the token.

If the third character is not a space character, the runtime parser can perform a test corresponding to the branch 630 to determine whether the third character is a dash character. If the third character is a dash character, the runtime parser can follow the branch 630 to a node 634. The node 634 indicates that only the date pattern 604 is a remaining candidate pattern. Accordingly, the runtime parser 632 can classify the token as a date value. In some implementations, the pattern 604 is also associated with the token. If the third character is not a dash character, the runtime parser can determine that the token is not a date value, since no candidate patterns have matched the token.

As mentioned, the classification tree 600 can be expanded to represent numerous other patterns of dates and also date and time combinations that represent a timestamp. Accordingly, traversal of the classification tree 600 can be more complex than what is illustrated. Regardless of the number of patterns represented, the classification tree 600 can be configured so that traversal of the classification tree 600 results in an earliest possible determination of whether a token represents a date or timestamp pattern represented in the classification tree 600.

FIG. 7 illustrates an example algorithm 700 for building a classification tree, according to an implementation. As will be understood by those of ordinary skill in the art, this example is only one of a myriad of possible algorithms consistent with this disclosure. The example algorithm 700 is provided for clarify and understanding and is not meant to limit the disclosure in any way. At line 1, the runtime parser 218 creates a tree object. For example, the runtime parser 218 can create a tree object representing the classification tree 600. At line 2, the runtime parser 218 creates a root node object. For example, the runtime parser 218 can create a node object that represents the root node 612. At line 3, the runtime parser 218 begins execution of a first repetition structure that is used to iterate over each line of training data. The training data can include vectors such as the vectors 602 and 604 that each represent a class of log entries.

At line 4, the runtime parser 218 places a current line of training data into an array, with a class number of the current line included in the last position of the array and the other elements of the array including component type identifiers included in the vector corresponding to the current line of training data. At line 5, the runtime parser 218 extracts the class number of the current line of training data from the array. For example, if the current line corresponds to the vector 602, a class number of "0" can be extracted.

At line 6, the runtime parser 218 initializes a current node variable to refer to the root node. For example, the current node variable can refer to the root node 612. At line 7, the runtime parser 218 begins execution of a second repetition structure that can be used to iterate over the elements of the array. At line 8, the runtime parser 218 extracts a current component type from the array.

At line 9, the runtime parser 218 determines whether the class number associated with the current line of training data is in a class collection associated with the current node. If the class number associated with the current line is not in a class collection, the runtime parser 218 adds the class number to the classes collection associated with the current node. At line 10, the runtime parser 218 increments an instance count associated with the current node.

At line 11, the runtime parse 218 determines whether all elements of the array have been processed. If all lines of the array have not been processed, the runtime parser 218 determines, at line 12, whether the child nodes associated with the current node include the current component type. If the child nodes associated with the current node do not include the current component type, the runtime parser 218, at line 13, creates a new node object. At line 14, the runtime parser 218 links the new node to the current node as a child node and associates the current component type with the new node. At line 16, the runtime parser 218 sets a current node reference to the newly created node.

If all lines of the array have been processed (e.g., based on the determination performed at line 11), the runtime parser 218, determines, at line 19, whether the current node includes a leaf node as a child node. If the current node does not include a leaf node as a child node, the runtime parser 218 adds a leaf node, at line 20, as a child node of the current node. At line 22, the runtime parser 218 determines whether the class number corresponding to the current line is included in a class collection associated with the leaf node, and if not, adds the class number to the classes collection associated with the leaf node.

Figure 8:
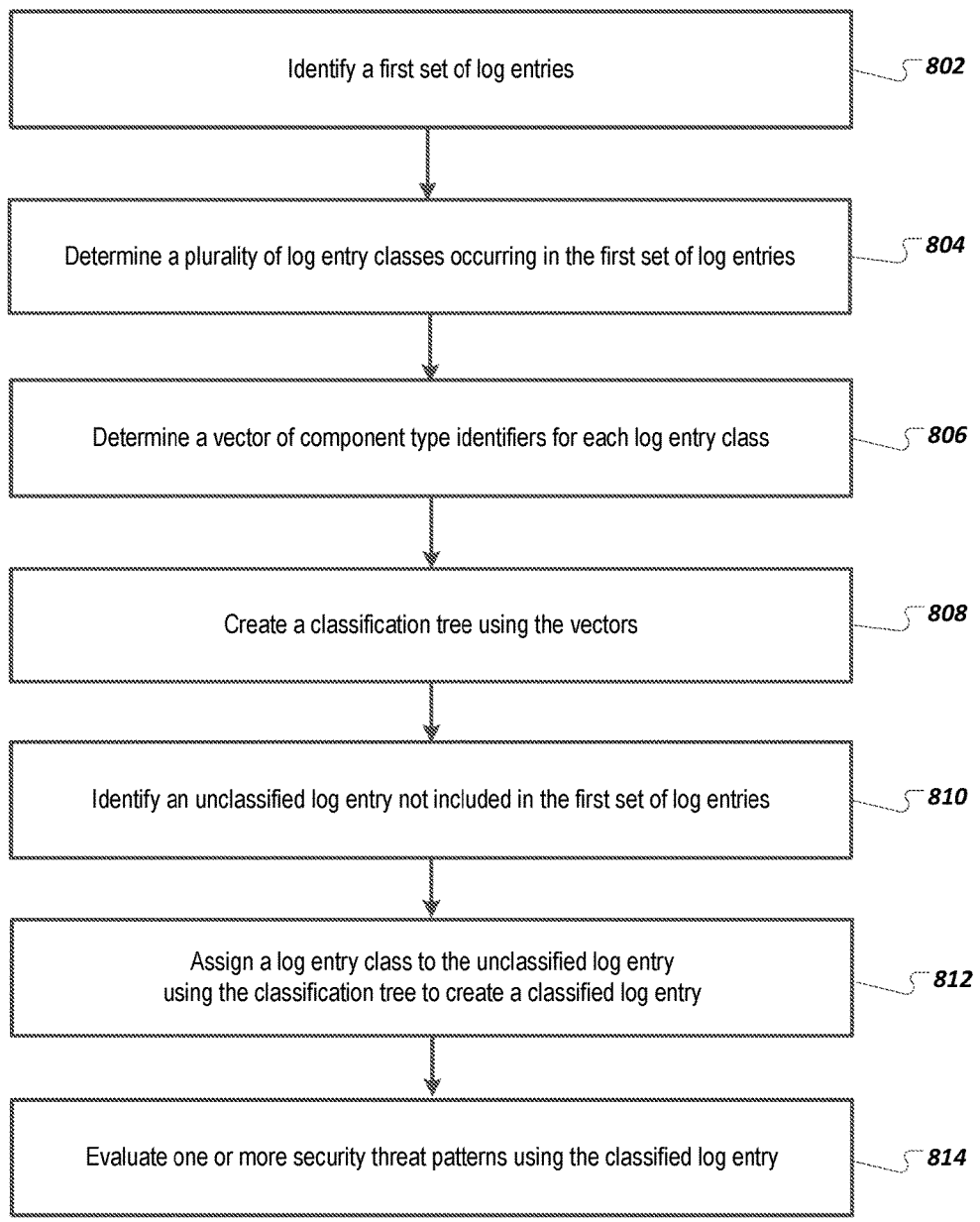
FIG. 8 is a flow chart of an example method for efficient identification of log events in enterprise threat detection, according to an implementation.

FIG. 8 is a flow chart of an example method for efficient identification of log events in enterprise threat detection, according to an implementation. For clarity of presentation, the description that follows generally describes method 800 in the context of FIGS. 1-8. However, it will be understood that method 800 may be performed, for example, by any other suitable system, environment, software, and hardware, or a combination of systems, environments, software, and hardware as appropriate.

At 802, a first set of log entries is identified. The first set of log entries can be, for example, training log entries. From 802, method 800 proceeds to 804.

At 804, a plurality of log entry classes occurring in the first set of log entries is determined. Each log entry in a given log entry class has a same number, type, and ordering of components. Components can be of different data types. For instance, example components can include timestamps, time values, IP addresses, variable text, literal text, user identifiers, etc. From 804, method 800 proceeds to 806.

At 806, a vector of component type identifiers is determined for each log entry class. Each component type identifier in a vector identifies a position and type of a component included in a log entry belonging to the log entry class associated with the vector. From 806, method 800 proceeds to 808.

At 808, a classification tree is created using the vectors. From 808, method 800 proceeds to 810. The classification tree can represent a plurality of candidate log entry classes. Each log entry class can be associated with a unique log entry class identifier. Each log entry class identifier can be included in a leaf node of the classification tree. Each vector can be represented in the classification tree as a path beginning at a root node and ending at a respective leaf node corresponding to the log entry class associated with the vector. Each respective non-leaf node of the classification tree can correspond to a particular token position of the unclassified log entry and to one or more candidate log entry classes that are each represented by a sub-path of the classification tree beginning at the root node and ending at the respective non-leaf node. Each branch of the classification tree can be associated with a component type identifier included in one or more vectors. Each branch can be associated with a test which evaluates a current token of the unclassified log message to determine whether the current token matches a component type associated with the branch.

At 810, an unclassified log entry not included in the first set of log entries is identified. For example, the unclassified log entry can be received from a log-providing system. From 810, method 800 proceeds to 812.

At 812, a log entry class is assigned to the unclassified log entry using the classification tree to create a classified log entry. Assigning the log entry class to the unclassified log entry can include evaluating tokens of the unclassified log entry in accordance with the classification tree. Candidate log entry classes can be eliminated from consideration until one remaining candidate log entry class remains, and the one remaining candidate log entry class can be assigned to the unclassified log entry.

Evaluating tokens can include identifying a current token of the unclassified log message and one or more respective branches of a current node of the classification tree. A test for each respective branch can be identified and performed, each test evaluating the current token of the unclassified log message to determine whether the current token matches a component type associated with the branch. A respective branch can be followed to a next node of the classification tree when an outcome of the test associated with the branch indicates a match between the current token and the component type associated with the branch. Assigning the log entry class can include determining that the next node is associated with the one remaining candidate log entry class and no other candidate log entry classes and assigning the one remaining candidate log entry class to the unclassified log entry. From 812, method 800 proceeds to 814.

At 814, one or more security threat patterns is evaluated using the classified log entry. For example, a threat pattern that includes the log entry class, and a threat associated with the threat pattern, can be identified. One or more actions can be performed in response to identifying the threat.

Figure 9:
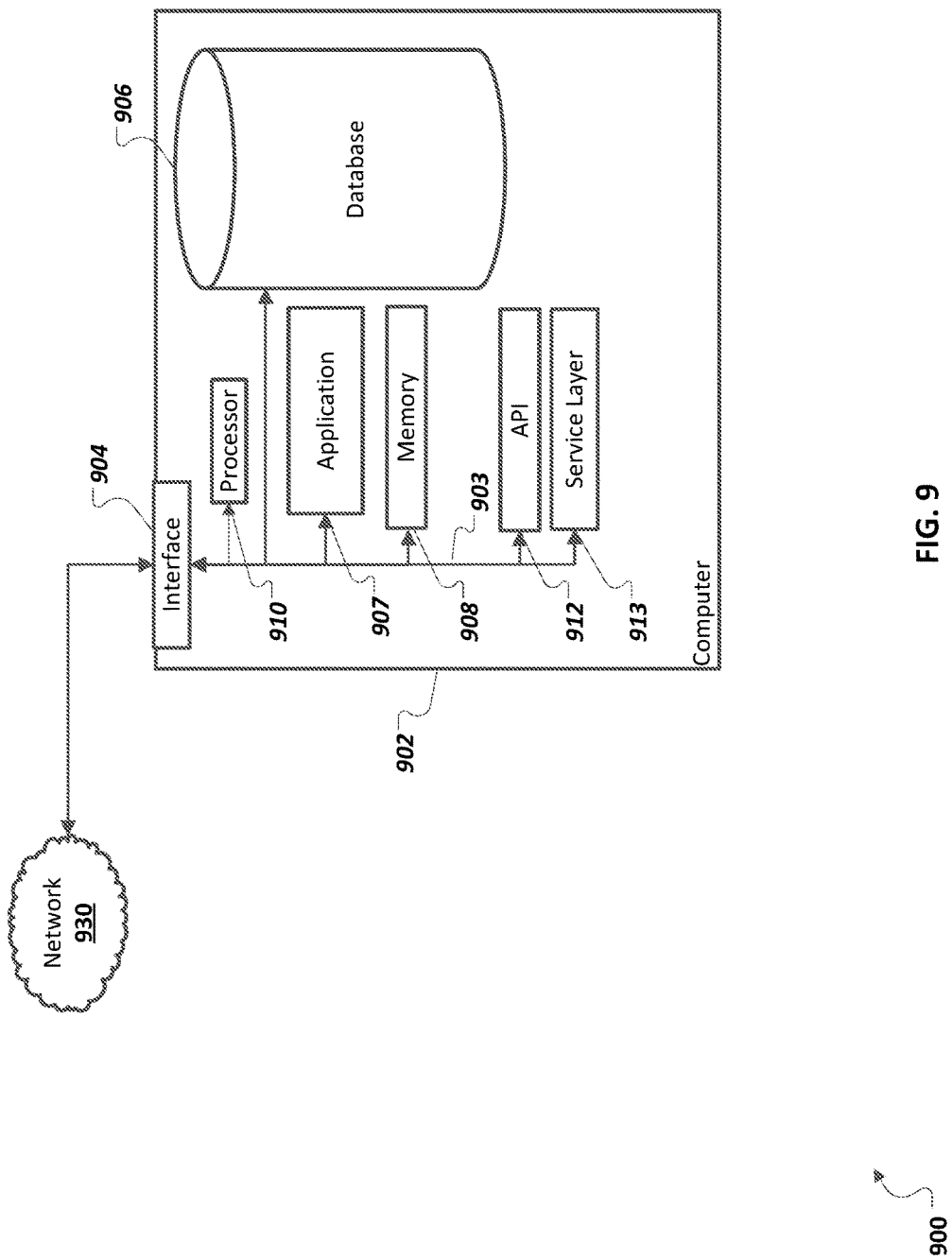
FIG. 9 is a block diagram of an exemplary computer used in the EDCS, according to an implementation.

FIG. 9 is a block diagram 900 of an exemplary computer 902 used in the EDCS, according to an implementation. The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 902 may comprise a computer that includes an input device, such as a keypad, keyboard, touch screen, or other device that can accept user information, and an output device that conveys information associated with the operation of the computer 902, including digital data, visual and/or audio information, or a GUI.

The computer 902 can process for/serve as a client, a server, and/or any other component of the EDCS (whether or not illustrated). The illustrated computer 902 is communicably coupled with a network 930 (e.g., network 140 of FIGS. 1 and 2). In some implementations, one or more components of the computer 902 may be configured to operate within a cloud-computing-based environment.

At a high level, the computer 902 is an electronic computing device operable to receive, transmit, process, store, or manage data and information associated with the EDCS. According to some implementations, the computer 902 may also include or be communicably coupled with a cloud-computing server, application server, e-mail server, web server, caching server, streaming data server, business intelligence (BI) server, and/or other server.

The computer 902 can generate requests to transmit over network 930 (e.g., as a client device) or receive requests over network 930 from a client application (e.g., a web browser or other application) and responding to the received requests by processing the said requests in an appropriate software application, hardware, etc. In addition, requests may also be sent to the computer 902 from internal users (e.g., from a command console or by other appropriate access method), external or third-parties, other automated applications, as well as any other appropriate entities, individuals, systems, or computers.

Each of the components of the computer 902 can communicate using a system bus 903. In some implementations, any and/or all the components of the computer 902, both hardware and/or software, may interface with each other and/or the interface 904 over the system bus 903 using an API 912 and/or a service layer 913. The API 912 may include specifications for routines, data structures, and object classes. The API 912 may be either computer-language independent or dependent and refer to a complete interface, a single function, or even a set of APIs. The service layer 913 provides software services to the computer 902 and/or the EDCS. The functionality of the computer 902 may be accessible for all service consumers using this service layer. Software services, such as those provided by the service layer 913, provide reusable, defined business functionalities through a defined interface. For example, the interface may be software written in JAVA, C++, ABAP, or other suitable language providing data in extensible markup language (XML) format or other suitable format. While illustrated as an integrated component of the computer 902, alternative implementations may illustrate the API 912 and/or the service layer 913 as stand-alone components in relation to other components of the computer 902 and/or the EDCS. Moreover, any or all parts of the API 912 and/or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or the EDCS. The interface 904 is used by the computer 902 for communicating with other systems in a distributed environment—including within the EDCS—connected to the network 930 (whether illustrated or not). Generally, the interface 904 comprises logic encoded in software and/or hardware in a suitable combination and operable to communicate with the network 930. More specifically, the interface 904 may comprise software supporting one or more communication protocols associated with communications such that the network 930 or interface's hardware is operable to communicate physical signals within and outside of the illustrated EDCS.

The computer 902 includes a processor 905. Although illustrated as a single processor 905 in FIG. 9, two or more processors may be used according to particular needs, desires, or particular implementations of the computer 902 and/or the EDCS. Generally, the processor 905 executes instructions and manipulates data to perform the operations of the computer 902. Specifically, the processor 905 executes the functionality required for efficient identification of log events in enterprise threat detection.

The computer 902 also includes a database 906 and memory 908 that hold data for the computer 902 and/or other components of the EDCS. Although illustrated as a single database 906 and memory 908 in FIG. 9, two or more databases 906 and memories 908 may be used according to particular needs, desires, or particular implementations of the computer 902 and/or the EDCS. While database 906 and memory 908 are illustrated as integral components of the computer 902, in alternative implementations, the database 906 and memory 908 can be external to the computer 902 and/or the EDCS. In some implementations, the database 906 can be a conventional database or an in-memory database, or a mix of both. In some implementations, the database 906 and memory 908 can be combined into one component.

The application 907 is an algorithmic software engine providing functionality according to particular needs, desires, or particular implementations of the computer 902 and/or the EDCS, particularly with respect to functionalities required for efficient identification of log events in enterprise threat detection. For example, application 907 can serve as the event stream processor 110, the runtime parser 218, or any other component of the EDCS (whether or not illustrated). Further, although illustrated as a single application 907, the application 907 may be implemented as multiple applications 907 on the computer 902. In addition, although illustrated as integral to the computer 902, in alternative implementations, the application 907 can be external to the computer 902 and/or the EDCS.

There may be any number of computers 902 associated with, or external to, the EDCS and communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method executed by at least one processor, the method comprising:
   identifying, by the at least one processor, a first set of log entries;
   determining, by the at least one processor, a plurality of log entry classes occurring in the first set of log entries, each log entry in a given log entry class having a same number, type, and ordering of components;
   determining, by the at least one processor and for each log entry class, a vector of component type identifiers for a given log entry class, each identifier in the vector identifying a position and type of a component included in a log entry belonging to the given log entry class;
   creating, by the at least one processor, a classification tree using the vectors, wherein the classification tree comprises a plurality of candidate log entry classes, wherein each log entry class is associated with a leaf node of the classification tree, wherein each vector is represented in the classification tree as a path beginning at a root node and ending at a respective leaf node corresponding to the log entry class associated with the vector, and wherein each respective non-leaf node of the classification tree corresponds to a particular token position of an unclassified log entry and to one or more candidate log entry classes that are each represented by a sub-path of the classification tree beginning at the root node and ending at the respective non-leaf node;
   identifying, by the at least one processor, an unclassified log entry not included in the first set of log entries;
   assigning, by the at least one processor, a log entry class to the unclassified log entry using the classification tree to create a classified log entry, wherein assigning the log entry class to the unclassified log entry using the classification tree comprises:
      evaluating tokens of the unclassified log entry in accordance with the classification tree by eliminating candidate log entry classes from consideration until one remaining candidate log entry class remains, wherein assigning the log entry class comprises assigning the one remaining candidate log entry class to the unclassified log entry, and wherein evaluating tokens of the unclassified log entry comprises:
         identifying a current token of the unclassified log entry and one or more respective branches of the identified current node of the classification tree;
         determining, for each of the one or more respective branches of the identified current token, whether the identified current token matches a component type associated with the respective branch;
         following a respective branch to a next node of the classification tree in response to determining that the identified current token matches the component type associated with the branch;
         in response to determining that the next node is a non-leaf node and that the next node is associated with only one remaining candidate log entry class and no other candidate log entry classes, assigning the one remaining candidate log entry class to the unclassified log entry; and
         in response to determining that the next node is associated with two or more remaining candidate log entry classes, returning to the determining operation for a next token of the unclassified log entry; and
   evaluating, by the at least one processor, one or more security threat patterns using the classified log entry.

2. The method of claim 1, wherein each log entry class is associated with a unique log entry class identifier.

3. The method of claim 2, wherein each log entry class identifier is included in a leaf node of the classification tree.

4. The method of claim 1, wherein each branch of the classification tree is associated with a component type identifier of one or more vectors.

5. A non-transitory, computer-readable medium storing computer-readable instructions, the instructions executable by a computer and configured to instruct the computer to:
   identify a first set of log entries;
   determine a plurality of log entry classes occurring in the first set of log entries, each log entry in a given log entry class having a same number, type, and ordering of components;
   determine, for each log entry class, a vector of component type identifiers for a given log entry class, each identifier in the vector identifying a position and type of a component included in a log entry belonging to the given log entry class;
   create a classification tree using the vectors, wherein the classification tree comprises a plurality of candidate log entry classes, wherein each log entry class is associated with a leaf node of the classification tree, wherein each vector is represented in the classification tree as a path beginning at a root node and ending at a respective leaf node corresponding to the log entry class associated with the vector, and wherein each respective non-leaf node of the classification tree corresponds to a particular token position of an unclassified log entry and to one or more candidate log entry classes that are each represented by a sub-path of the classification tree beginning at the root node and ending at the respective non-leaf node;
   identify an unclassified log entry not included in the first set of log entries;
   assign a log entry class to the unclassified log entry using the classification tree to create a classified log entry, wherein assigning the log entry class to the unclassified log entry using the classification tree comprises:

evaluating tokens of the unclassified log entry in accordance with the classification tree by eliminating candidate log entry classes from consideration until one remaining candidate log entry class remains, wherein assigning the log entry class comprises assigning the one remaining candidate log entry class to the unclassified log entry, and wherein evaluating tokens of the unclassified log entry comprises:

identifying a current token of the unclassified log entry and one or more respective branches of the identified current node of the classification tree;

determining, for each of the one or more respective branches of the identified current token, whether the identified current token matches a component type associated with the respective branch;

following a respective branch to a next node of the classification tree in response to determining that the identified current token matches the component type associated with the branch;

in response to determining that the next node is a non-leaf node and that the next node is associated with only one remaining candidate log entry class and no other candidate log entry classes, assigning the one remaining candidate log entry class to the unclassified log entry; and in response to determining that the next node is associated with two or more remaining candidate log entry classes, returning to the determining operation for a next token of the unclassified log entry; and evaluate one or more security threat patterns using the classified log entry.

6. A system, comprising:

a memory;

at least one hardware processor interoperably coupled with the memory and configured to:

identify a first set of log entries;

determine a plurality of log entry classes occurring in the first set of log entries, each log entry in a given log entry class having a same number, type, and ordering of components;

determine, for each log entry class, a vector of component type identifiers for a given log entry class, each identifier in the vector identifying a position and type of a component included in a log entry belonging to the given log entry class;

create a classification tree using the vectors, wherein the classification tree comprises a plurality of candidate log entry classes, wherein each log entry class is associated with a leaf node of the classification tree, wherein each vector is represented in the classification tree as a path beginning at a root node and ending at a respective leaf node corresponding to the log entry class associated with the vector, and wherein each respective non-leaf node of the classification tree corresponds to a particular token position of an unclassified log entry and to one or more candidate log entry classes that are each represented by a sub-path of the classification tree beginning at the root node and ending at the respective non-leaf node;

identify an unclassified log entry not included in the first set of log entries;

assign a log entry class to the unclassified log entry using the classification tree to create a classified log entry, wherein assigning the log entry class to the unclassified log entry using the classification tree comprises:

evaluating tokens of the unclassified log entry in accordance with the classification tree by eliminating candidate log entry classes from consideration until one remaining candidate log entry class remains, wherein assigning the log entry class comprises assigning the one remaining candidate log entry class to the unclassified log entry, and wherein evaluating tokens of the unclassified log entry comprises:

identifying a current token of the unclassified log entry and one or more respective branches of the identified current node of the classification tree;

determining, for each of the one or more respective branches of the identified current token, whether the identified current token matches a component type associated with the respective branch;

following a respective branch to a next node of the classification tree in response to determining that the identified current token matches the component type associated with the branch;

in response to determining that the next node is a non-leaf node and that the next node is associated with only one remaining candidate log entry class and no other candidate log entry classes, assigning the one remaining candidate log entry class to the unclassified log entry; and in response to determining that the next node is associated with two or more remaining candidate log entry classes, returning to the determining operation for a next token of the unclassified log entry; and evaluate one or more security threat patterns using the classified log entry.

7. The non-transitory, computer-readable medium of claim 5, wherein each log entry class is associated with a unique log entry class identifier.

8. The non-transitory, computer-readable medium of claim 7, wherein each log entry class identifier is included in a leaf node of the classification tree.

9. The non-transitory, computer-readable medium of claim 5, wherein each branch of the classification tree is associated with a component type identifier of one or more vectors.

10. The system of claim 6, wherein each log entry class is associated with a unique log entry class identifier.

11. The system of claim 10, wherein each log entry class identifier is included in a leaf node of the classification tree.

12. The system of claim 6, wherein each branch of the classification tree is associated with a component type identifier of one or more vectors.

\* \* \* \* \*